United States Patent
Scheinerman et al.

(10) Patent No.: US 10,802,940 B1
(45) Date of Patent: Oct. 13, 2020

(54) APPROACHES FOR ANALYZING DATA STREAMS

(71) Applicant: Palantir Technologies Inc., Palo Alto, CA (US)

(72) Inventors: Jonah Scheinerman, New York, NY (US); Callum Rogers, London (GB); Gregory Slonim, London (GB); Matej Hamas, Bratislava (SK)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/984,969

(22) Filed: May 21, 2018

Related U.S. Application Data

(60) Provisional application No. 62/509,517, filed on May 22, 2017.

(51) Int. Cl.
*G06F 11/32* (2006.01)
*G06F 11/36* (2006.01)
*G06F 11/30* (2006.01)

(52) U.S. Cl.
CPC .......... *G06F 11/323* (2013.01); *G06F 11/302* (2013.01); *G06F 11/3664* (2013.01); *G06F 2201/86* (2013.01); *G06F 2201/865* (2013.01)

(58) Field of Classification Search
CPC ..... G06F 11/30–3495; G06F 17/30516; G06F 3/04842; G06F 16/24568; G06F 2201/86; G06F 2201/865; G06F 2201/87; G06F 2201/875; G06T 11/206; G06T 13/80

USPC .................................................. 717/127–135
See application file for complete search history.

(56) References Cited

U.S. PATENT DOCUMENTS

| | | | | |
|---|---|---|---|---|
| 8,990,777 | B2 * | 3/2015 | Gounares | G06F 11/3664 717/125 |
| 9,246,773 | B2 * | 1/2016 | Degioanni | G06F 11/3495 |
| 9,507,686 | B2 * | 11/2016 | Horn | G06F 8/65 |
| 2013/0232433 | A1 * | 9/2013 | Krajec | G06F 3/048 715/771 |
| 2014/0013309 | A1 * | 1/2014 | Gounares | G06F 11/3664 717/125 |
| 2015/0052441 | A1 * | 2/2015 | Degioanni | G06F 11/3495 715/734 |
| 2015/0180739 | A1 * | 6/2015 | Horn | G06F 8/65 709/224 |
| 2017/0083585 | A1 * | 3/2017 | Chen | G06F 17/30554 |
| 2018/0276106 | A1 * | 9/2018 | Grant | G06F 9/30058 |

* cited by examiner

*Primary Examiner* — Todd Aguilera
(74) *Attorney, Agent, or Firm* — Sheppard Mullin Richter & Hampton LLP

(57) ABSTRACT

Systems and methods are provided for executing a program that produces one or more data streams. A visual graph can be generated based at least in part on the data streams. A given data stream can be represented in the visual graph as a dot and a connection between a pair of data streams can be represented in the visual graph as an arc connecting a pair of dots representing the pair of data streams. The visual graph can be provided for presentation through an interface. The visual graph can provide a visual representation of an execution state of the program during execution.

18 Claims, 9 Drawing Sheets

APPROACHES FOR ANALYZING DATA STREAMS

CROSS REFERENCE TO RELATED APPLICATIONS

This application claims the benefit under 35 U.S.C. § 119(e) of U.S. Provisional Application Ser. No. 62/509,517 filed May 22, 2017, the content of which is incorporated by reference in its entirety into the present disclosure.

FIELD OF THE INVENTION

This disclosure relates to approaches for visualizing data.

BACKGROUND

Reactive programming is an approach for creating asynchronous and event-based applications using observable sequences. In general, an observable sequence may correspond to a series of events (e.g., user input, intervals, etc.), system notifications, web service requests, or streams of data from a file or web service, to name some examples. Such observable sequences can be used by applications to provide some functionality. For example, a gaming application may produce some feedback in response to detecting a pre-defined number of mouse clicks occurring every 5 seconds for 30 seconds.

SUMMARY

Various implementations of the present disclosure can include systems, methods, and non-transitory computer readable media configured to perform executing a program that produces one or more data streams; generating a visual graph based at least in part on the data streams, wherein a given data stream is represented in the visual graph as a dot, and wherein a connection between a pair of data streams is represented in the visual graph as an arc connecting a pair of dots representing the pair of data streams; and providing the visual graph for presentation through an interface, wherein the visual graph provides a visual representation of an execution state of the program during execution.

In some implementations, the visual graph is animated in response to events occurring in the data streams.

In some implementations, the visual graph indicates when an event occurs in a given data stream by applying a visual animation to a dot corresponding to the data stream.

In some implementations, the interface includes an option to access event-based information corresponding to a dot represented in the visual graph.

In some implementations, the interface includes an option to replay execution of the program.

In some implementations, the systems, methods, and non-transitory computer readable media are configured to determine that the option was selected and apply one or more animations to the visual graph based on a replayed execution of the program.

In some implementations, the program is not re-executed to apply the animations to the visual graph.

In some implementations, the visual graph is pruned automatically.

In some implementations, the systems, methods, and non-transitory computer readable media are configured to provide a timeline in the interface, wherein the timeline indicates when events occur during execution of the program.

In some implementations, a segment in the timeline can be selected to identify events that occurred during a time interval corresponding to the segment.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

As mentioned, reactive programming is an approach for creating asynchronous and event-based applications using observable sequences. In general, an observable sequence may correspond to a series of events (e.g., user input, intervals, etc.), system notifications, web service requests, or streams of data from a file or web service, to name some examples. Such observable sequences can be used by applications to provide some functionality. For example, a gaming application may produce some feedback in response to detecting a pre-defined number of mouse clicks occurring every 5 seconds for 30 seconds. In general, creating asynchronous and event-based applications can be a lengthy and burdensome process especially in view of the amount of debugging time that may be required.

A claimed solution rooted in computer technology overcomes problems specifically arising in the realm of computer technology. In various embodiments, various data streams (e.g., event streams, observables, etc.) can be visualized through a graphical user interface. In some embodiments, the visualizations can be generated by modifying one or more programming libraries that implement reactive programming functionality. For example, instances of observable methods called in a given program are both invoked and also represented in a visual graph. In some embodiments, the visual graph can represent each stream as a dot. In such embodiments, a connection between two streams can be represented in the visual graph as an arc between a pair of dots corresponding to the two streams. The visual graph can automatically be updated (or animated) to illustrate an execution state of the program as the program is being executed. As a result, the visual graph can provide visualizations of events occurring in a given data stream, when those events occurred, and where data is being processed at any given point during execution. These visualizations can help decrease debugging time and thus improve the overall process for creating asynchronous and event-based applications.

Figure 1:
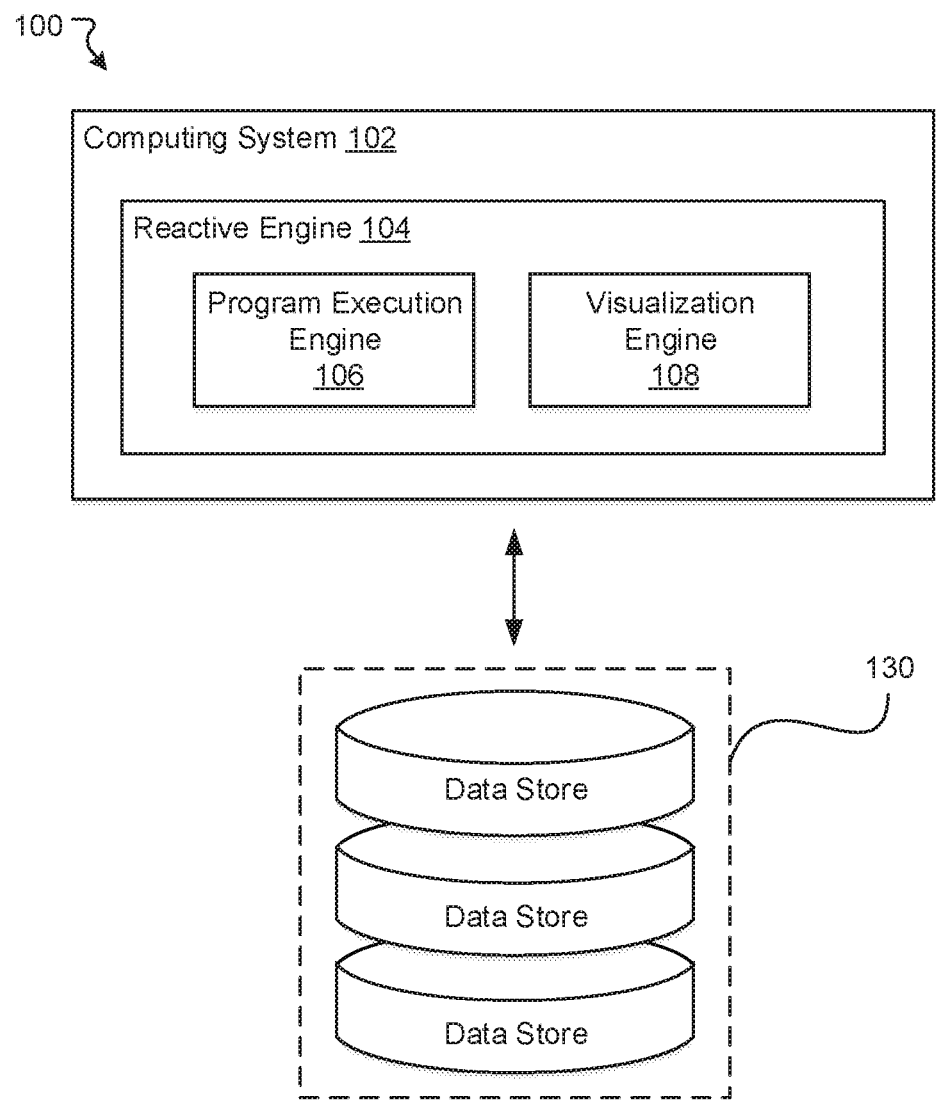
FIG. 1 illustrates an example environment, in accordance with various embodiments.

FIG. 1 illustrates an example environment 100, in accordance with various embodiments. The example environment 100 can include at least one computing system 102 that includes one or more processors and memory. The processors can be configured to perform various operations by interpreting machine-readable instructions.

In some embodiments, the computing system 102 can include a reactive engine 104. The reactive engine 104 can include a program execution engine 106 and a visualization engine 108. In various embodiments, the reactive engine 104 can be executed by the processor(s) of the computing system 102 to perform various operations including those described in reference to the program execution engine 106 and the visualization engine 108. In general, the reactive engine 104 can be implemented, in whole or in part, as software that is capable of running on one or more computing devices or systems. In one example, the reactive engine 104 may be implemented as or within a software application running on one or more computing devices (e.g., user or client devices) and/or one or more servers (e.g., network servers or cloud servers). In some instances, various aspects of the reactive engine 104, the program execution engine 106, and/or the visualization engine 108 may be implemented in one or more computing systems and/or devices. The environment 100 may also include one or more data stores 130 that are accessible to the computing system 102. In general, a data store may be any device in which data can be stored and from which data can be retrieved. The data stores 130 may be accessible to the computing system 102 either directly or over a network. This network may be any wired or wireless network through which data can be sent and received (e.g., the Internet).

In various embodiments, the program execution engine 106 can be configured to run software programs (or applications) that have been implemented using various software programming languages. These languages may be compiled or interpreted. In some embodiments, the program execution engine 106 can be configured to invoke various software tools (e.g., compilers, interpreters, etc.) needed to run software programs implemented using compiled languages. For example, the program execution engine 106 can be configured to invoke a Java© compiler and interpreter to run a software program implemented using the Java© programming language. In some embodiments, the program execution engine 106 can be configured to invoke various software tools (e.g., interpreter, web browser, etc.) needed to run software programs implemented using interpreted languages. For example, the program execution engine 106 can be configured to invoke a JavaScript© interpreter to run a software program implemented using the JavaScript© programming language.

In various embodiments, the visualization engine 108 can be configured to generate visualizations of data streams that are created by software programs executed by the program execution engine 106. In some embodiments, a data stream can correspond to any type of observable sequence. In general, an observable sequence may correspond to a series of detected events (e.g., user input, intervals, etc.), system notifications, web service requests, or streams of data from a file or web service, to name some examples. An observable sequence may be used to provide some event-based functionality, for example. In some instances, multiple observable sequences can be manipulated, either individually or in combination, to provide various functionality. In some embodiments, data streams may be created using one or more reactive programming libraries (e.g., RxJS, RxJava, etc.). In some embodiments, the visualization engine 108 may be implemented within such reactive programming libraries. For example, a reactive programming library can be modified to generate visualizations of data streams as those data streams are created and processed by the library. In one example, the observable call can be modified so that a corresponding visualization is generated for any observable that is created by a software program. More details describing the visualization engine 108 will be provided below in reference to FIG. 2.

Figure 2:
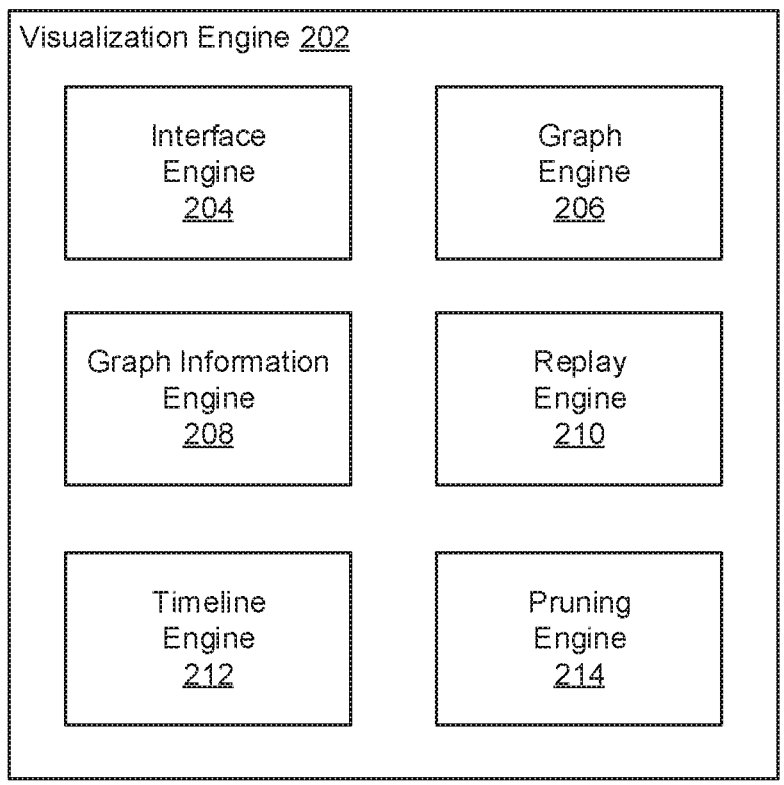
FIG. 2 illustrates an example visualization engine, in accordance with various embodiments.

FIG. 2 illustrates an example visualization engine 202, in accordance with various embodiments. The visualization engine 202 may be implemented as the visualization engine 108 of FIG. 1. In some embodiments, the visualization engine 202 includes an interface engine 204, a graph engine 206, a graph information engine 208, a replay engine 210, a timeline engine 212, and a pruning engine 214.

The interface engine 204 can be configured to generate and provide an interface (e.g., graphical user interface) through which data streams can be visualized. For example, the interface can be provided by a software application (e.g., visualization application, web browser, etc.) running on a computing device and through a display screen of the computing device. In various embodiments, the interface engine 204 can provide the interface when a software program is being executed, for example, by the program execution engine 106 of FIG. 1. In such embodiments, this interface can provide a visual representation of the various data streams that are created and processed during execution of the software program.

The graph engine 206 can be configured to generate visual representations of data streams. In some embodiments, when generating such visual representations, the graph engine 206 can generate a visual graph in which data streams are represented. This visual graph can be used to illustrate the various execution states of the software program during execution. Therefore, a user (e.g., developer) viewing this visual graph is able to observe when events occur in data streams and how these events impact the overall execution of the software program.

In some embodiments, the graph engine 206 can represent each data stream in a visual graph as a dot (or node). For example, a software program can create a data stream in which events are triggered at some pre-defined time interval (e.g., "Observable.Interval(3000)"). In this example, a dot corresponding to this data stream can be used to represent events that occur in this data stream at the pre-defined time intervals. Similarly, in some embodiments, operations performed in relation to a given data stream can also be represented in the visual graph as dots. For example, a map operation may perform some functionality using events that occur in a data stream (e.g., ".map(square)"). In this example, the map operation can be represented in the visual graph as a separate dot (or node).

Often, events from one data stream may be used in combination with one or more different data streams and/or operations. In some embodiments, to illustrate a relationship between a first data stream and a second data stream, the graph engine 206 can draw an arc (or edge) between a node representing the first data stream and a node representing the second data stream. Similarly, when events from one data stream are used in conjunction with some operation (e.g., ".map(square)"), the graph engine 206 can draw an arc (or edge) between a node representing the first data stream and a node representing the operation. In instances where events from a first operation are used in conjunction with a second operation, the graph engine 206 can draw an arc (or edge) between a node representing the first operation and a node representing the second operation. As a result, these arcs can be used to indicate pathways through which event data flows during execution of a given software program.

As mentioned, a visual graph generated for a given software program can be used to illustrate the various execution states of the software program during execution. In some embodiments, the visual graph can be animated based on events detected in various data streams and/or events being manipulated by various operations. For example, in some embodiments, a dot corresponding to a given data stream can be animated (e.g., flashed) in response to events being detected in that data stream. Similarly, a dot corresponding to an operation can be animated (e.g., flashed) in response to events being detected in a data stream from which the operation evaluates events. In such embodiments, the animations of the dots allow a real-time indication of when events are detected and how such events propagate to other dots (e.g., data streams, operations) in the visual graph.

As mentioned, a visual graph can be presented and animated through an interface provided by the interface engine 204. Such animations can provide visual feedback of a software program's execution. In some embodiments, a user can interact with the interface to obtain additional details about a given data stream and/or operation represented in the visual graph. For example, in some embodiments, the graph information engine 208 can be configured to provide event-based information for various dots. In such embodiments, the user accessing the interface can select (e.g., click on) a given dot to reveal event-based information corresponding to a data stream (or operation) associated with that dot. For example, this event-based information may indicate a count of events that were detected in the data stream (or operation) associated with the dot.

There may be instances where a user does not have enough time to sufficiently visualize an execution flow of a software program. For example, the software program may finish executing before the user has an opportunity to evaluate the various events that are detected during the software program's execution. Rather than re-executing the software program, in some embodiments, the replay engine 210 can be configured to replay a snapshot of the original execution. For example, the replay engine 210 can record the original execution of the software program. In some embodiments, the replay engine 210 records animations applied to a visual graph that was generated for the software program. In such embodiments, the replay engine 210 can provide an option to replay the original execution without actually re-executing the software program. As part of this replay, the replay engine 210 also replays the visualization of the software program's execution through an interface provided by the interface engine 204. This visualization can be presented by applying the appropriate animations to the visual graph based on the software program's original execution.

The timeline engine 212 can be configured to provide a timeline that plots events that occur in relation to data streams created and processed during execution of a software program. In some embodiments, the timeline engine 212 can also be configured to plot events that occur in relation to operations performed during execution of the software program. This timeline may be accessible through the interface provided by the interface engine 204, for example. In some embodiments, the timeline can indicate when events occur during execution of the software program. For example, the timeline can be divided into a set of segments that each correspond to some measure of time (e.g., 1-second segments). In some embodiments, each segment is associated with a counter that indicates the number of events that occurred during execution of the software program during a time interval corresponding to that segment. For example, the timeline can indicate that a total of 9 events occurred between seconds 3 and 4 of the software program's execution. In some embodiments, this timeline is interactive. For example, in some embodiments, a user can select (e.g., click on) a given segment in the timeline to animate a visual graph corresponding to the software program. In such embodiments, the events that occurred during the given segment can be identified and replayed in the visual graph.

In some instances, visual graphs may need to be pruned. For example, a visual graph in which many data streams are represented may become convoluted. In various embodiments, the pruning engine 214 can be configured to automatically prune visual graphs. In some embodiments, a visual graph is pruned when the visual graph includes a threshold number of dots and/or a threshold number of arcs. In some embodiments, when pruning the visual graph, the pruning engine 214 can identify any data streams that are marked as being completed. For example, a data stream in which all observable events have occurred can set a parameter that indicates the data stream is ready for garbage collection. In this example, the pruning engine 214 can update the visual graph to remove any dots and arcs corresponding to data streams that are ready for garbage collection.

Figure 3A:
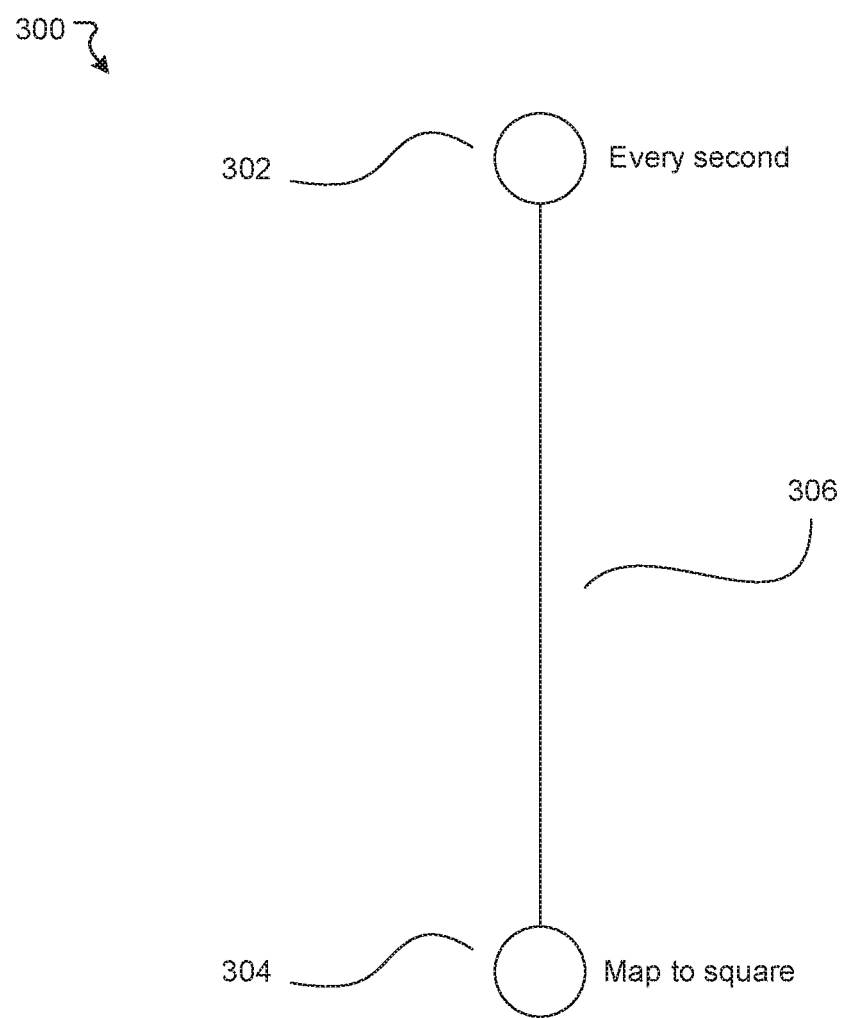
FIGS. 3A-3C illustrate example visual graphs, in accordance with various embodiments.
Figure 3B:
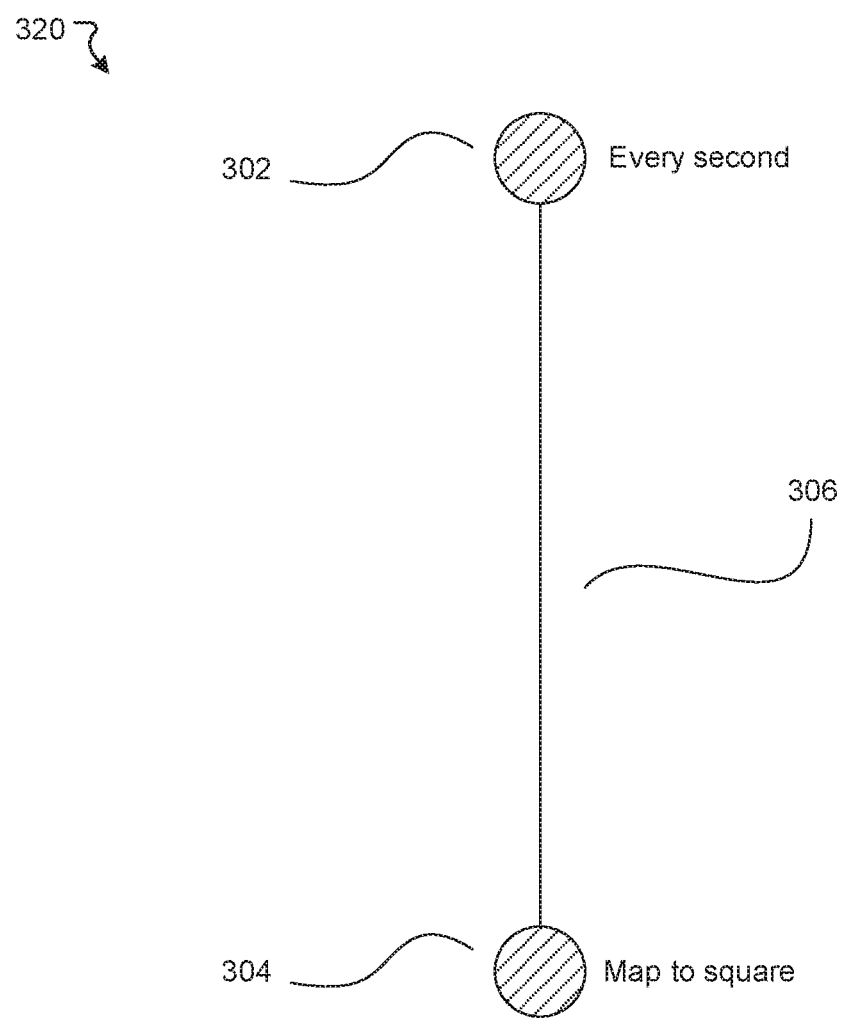
Figure 3C:
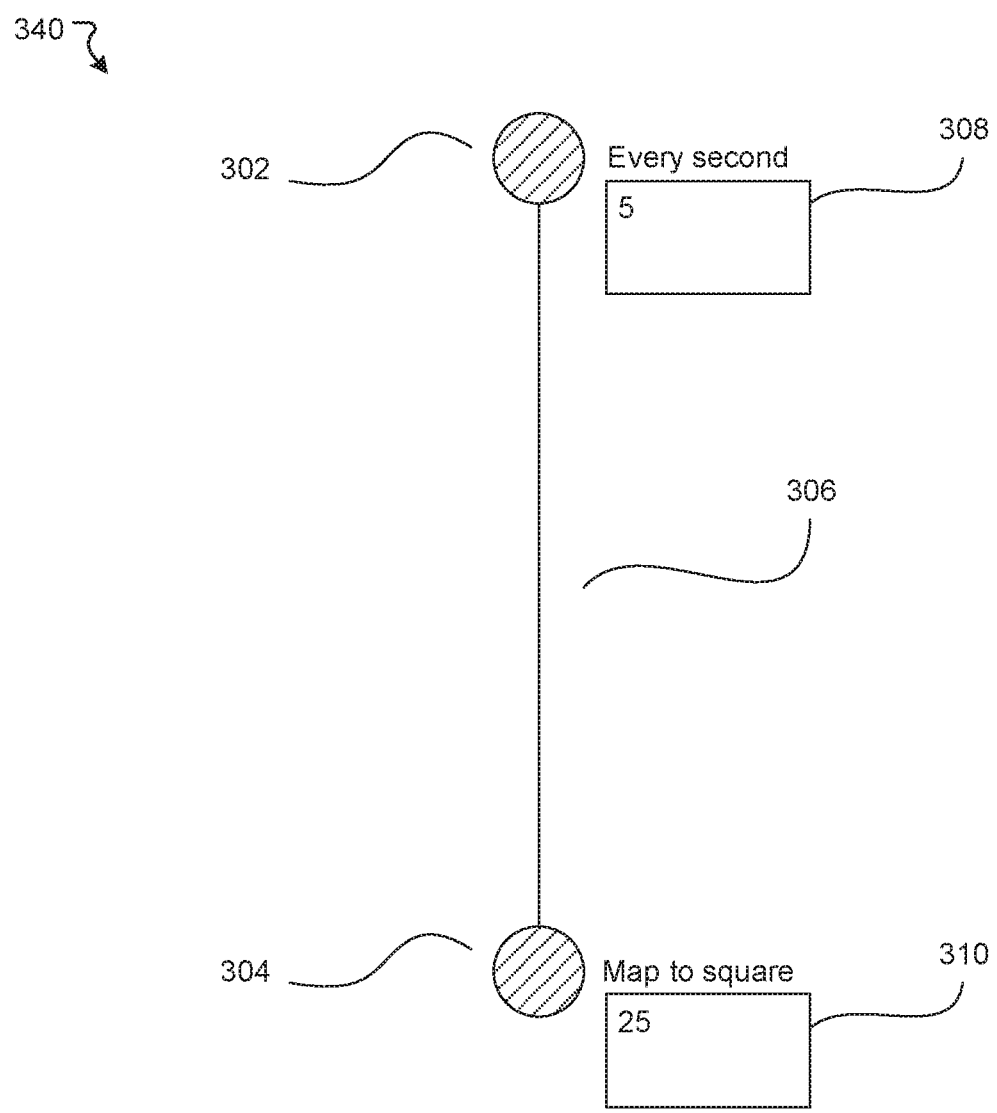

FIG. 3A illustrates an example diagram of a visual graph 300, in accordance with various embodiments. The visual graph 300 may be presented through an interface that is provided by a software application running on a computing device. The visual graph 300 includes a first dot 302 and a second dot 304. As shown, the first dot 302 and the second dot 304 are connected to one another through an arc 306. In this example, the first dot 302 corresponds to a data stream in which an event is triggered every second and the second dot 304 corresponds to a map to square operation on events originating from the data stream. As mentioned, in some embodiments, the visual graph 300 can be animated as its corresponding software program is executed. For example, the visual graph 300 can be animated by flashing each dot whenever an event occurs in its corresponding data stream (or operation), as illustrated in the example of FIG. 3B. FIG. 3B illustrates an example diagram of a visual graph 320, in accordance with various embodiments. As a result, the first dot 302 and the second dot 304 will both animate every second when an event is detected in the data stream corresponding to the first dot 302. In some embodiments, the user accessing the interface can select (e.g., click on) a given dot to reveal event-based information corresponding to a data stream (or operation) associated with that dot. For example, in FIG. 3C, the user has selected both the first dot 302 and the second dot 304. As a result, the visual graph 340 is shown with a first information field 308 corresponding to the first dot 302 and a second information field 310 corresponding to the second dot 304.

Figure 4A:
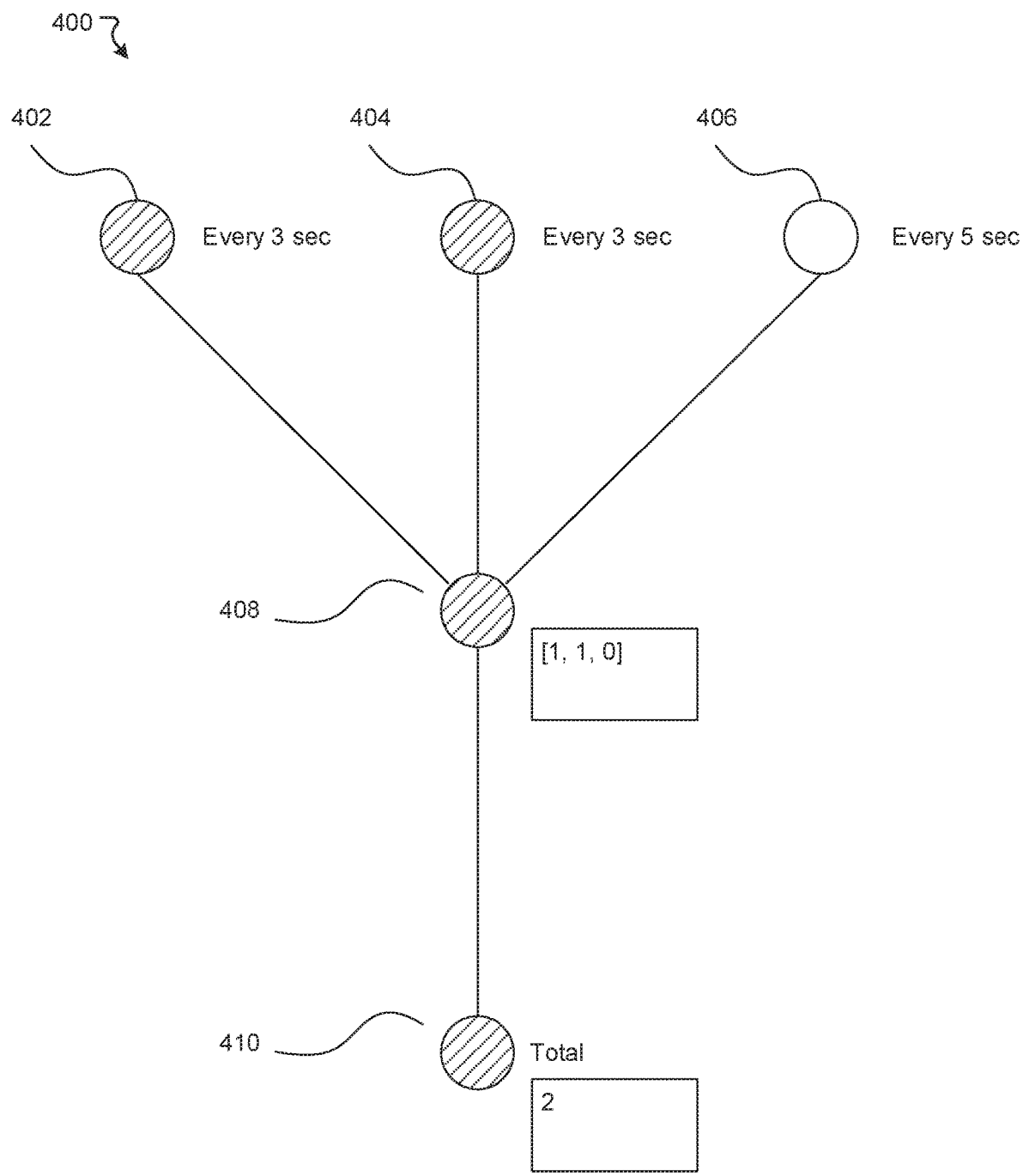
FIGS. 4A-4B illustrate additional example visual graphs, in accordance with various embodiments.
Figure 4B:
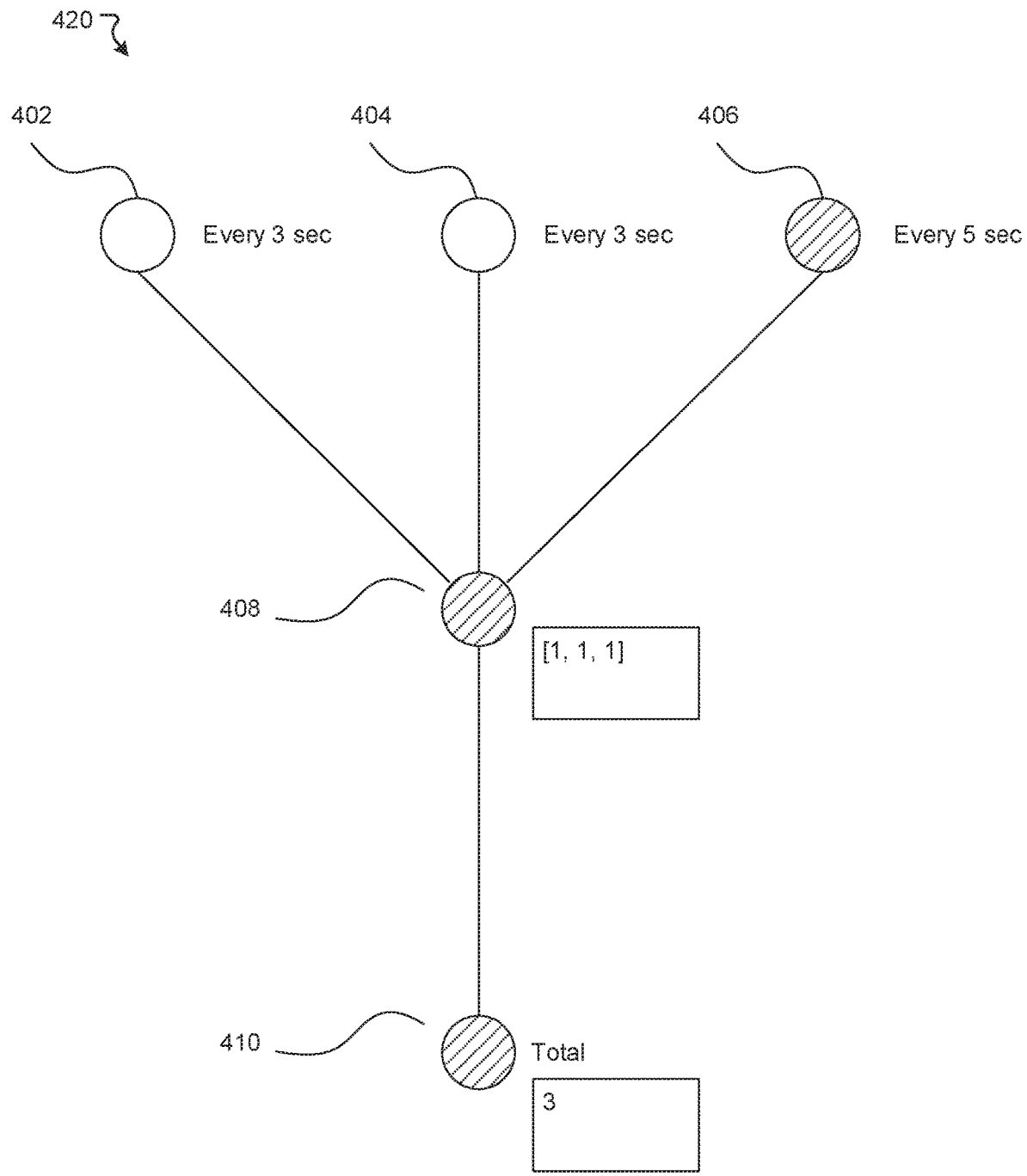

FIG. 4A illustrates an example diagram of a visual graph 400, in accordance with various embodiments. The visual graph 400 may be presented through an interface that is provided by a software application running on a computing device. The visual graph 400 may represent some software program. In this example, the visual graph 400 includes a first dot 402 in which an event is represented every 3 seconds, a second dot 404 in which an event is also represented every 3 seconds, a third dot 406 in which an event is represented every 5 seconds, a fourth dot 408 which combines events originating from the first dot 402, the second dot 404, and the third dot 406. The visual graph 400 also includes a fifth dot 410 which produces a sum total of events originating from the first dot 402, the second dot 404, and the third dot 406. In the example of FIG. 4A, both the first dot 402 and the second dot 404 are animated due to events being detected in their respective data streams. As a result, both the fourth dot 408 which corresponds to the combine operation and the fifth dot 410 which corresponds to the sum operation are also animated. FIG. 4B illustrates another execution state of the software program represented by the visual graph 420. In this example, the third dot 406 is animated due to an event being detected in its corresponding data stream. In response, both the fourth dot 408 which corresponds to the combine operation and the fifth dot 410 which corresponds to the sum operation are also animated. Meanwhile, both the first dot 402 and the second dot 404 are not animated since no events are occurring in their respective data streams.

Figure 5:
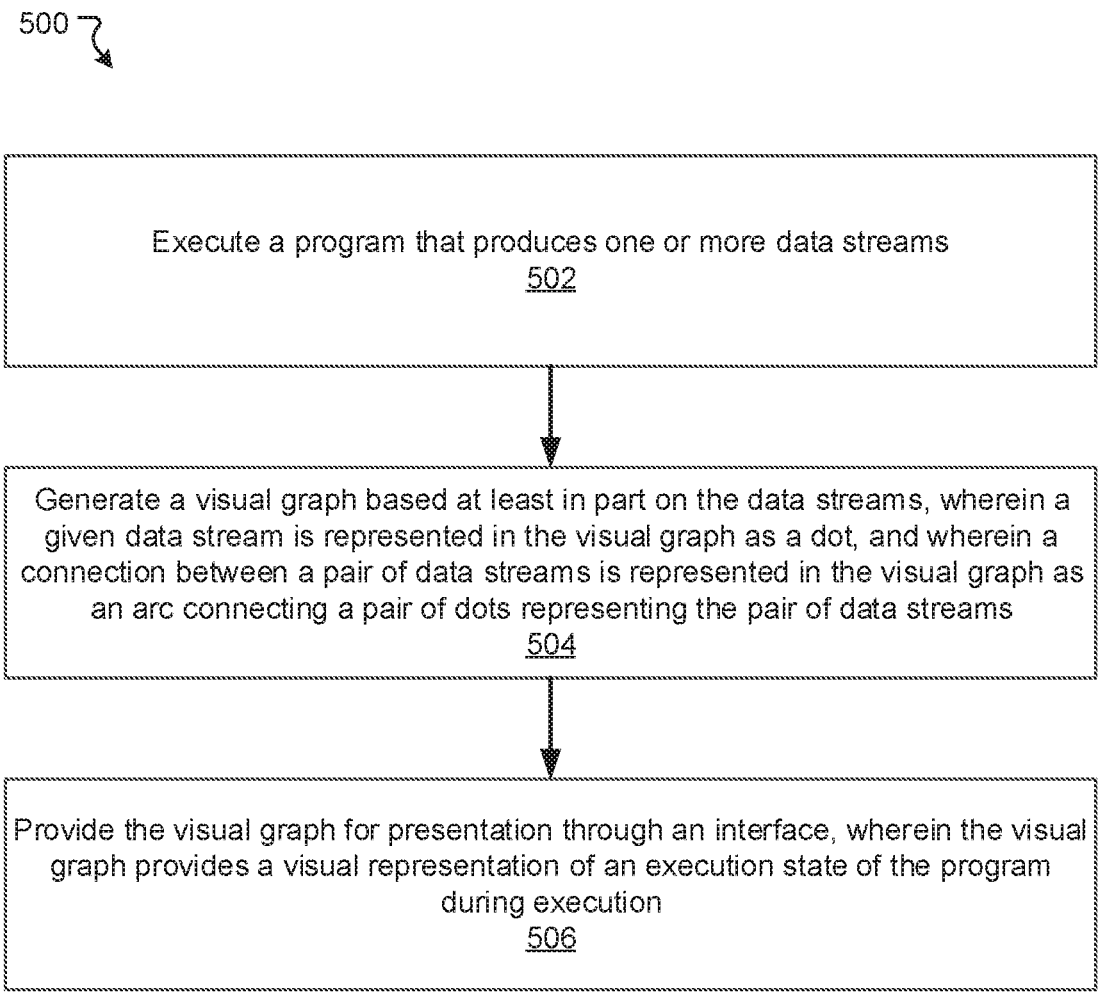
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, a program that produces one or more data streams can be executed. At block 504, a visual graph can be generated based at least in part on the data streams. A given data stream can be represented in the visual graph as a dot and a connection between a pair of data streams can be represented in the visual graph as an arc connecting a pair of dots representing the pair of data streams. At block 506, The visual graph can be provided for presentation through an interface. The visual graph can provide a visual representation of an execution state of the program during execution.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as IOS, ANDROID, CHROME OS, WINDOWS XP, WINDOWS VISTA, WINDOWS 7, WINDOWS 8, WINDOWS SERVER, WINDOWS CE, UNIX, LINUX, SUNOS, SOLARIS, IOS, BLACKBERRY OS, VXWORKS, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
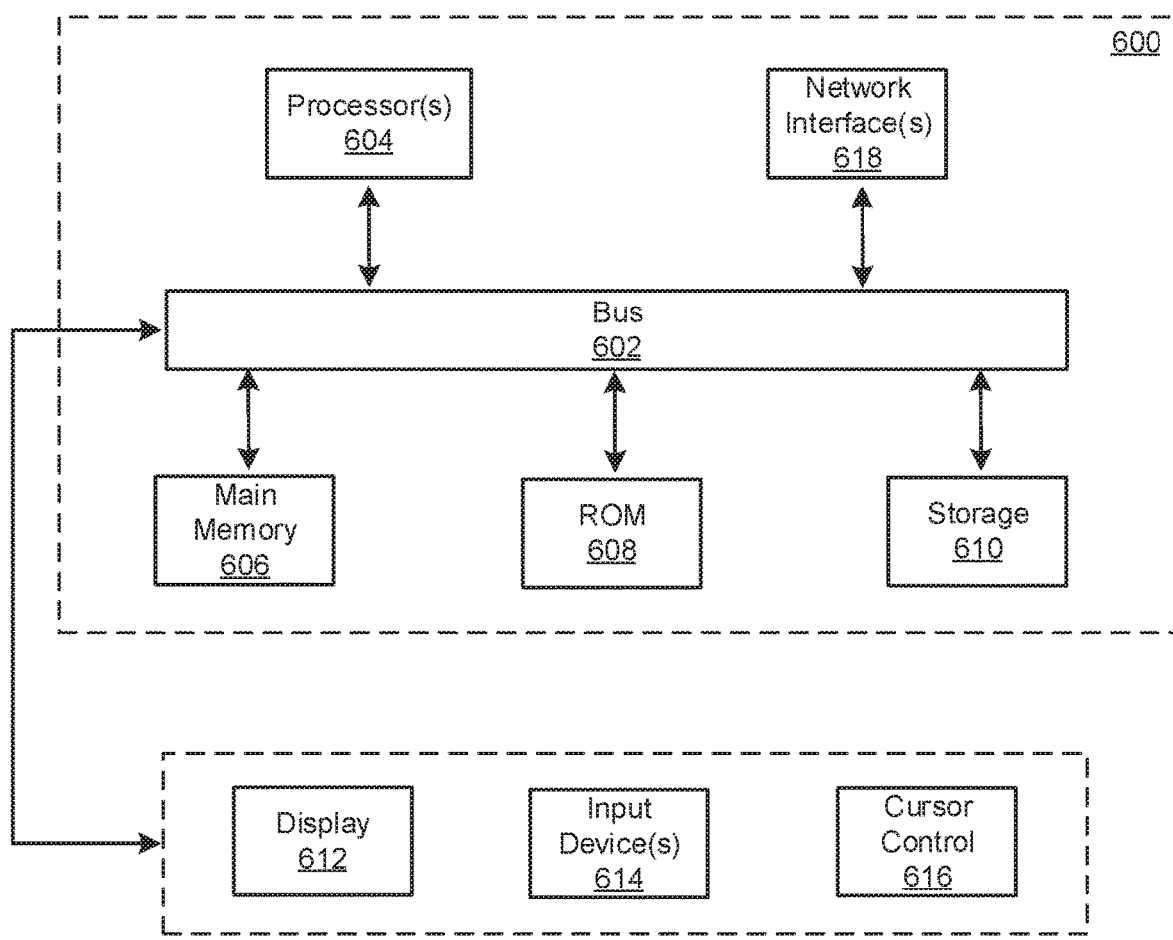
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method, the method comprising:
executing a program that produces data streams;
generating a visual graph based at least in part on the data streams, wherein the data streams are represented in the visual graph as respective particular dots, a connection between a pair of the data streams is represented in the visual graph as an arc connecting a pair of the particular dots, a combination or a sum of events originating from at least a first particular dot and a second particular dot of the particular dots is represented in the visual graph as an other dot, the first particular dot indicates a first event being detected at a first frequency, the second particular dot indicates a second event being detected at a second frequency, and the other dot indicates the first event being detected and the second event being detected, the other dot being animated at the first frequency in response to the first event being detected at a data stream represented by the first particular dot and animated at the second frequency in response to the second event being detected at a data stream represented by the second particular dot; and
providing the visual graph for presentation through an interface, wherein the visual graph provides a visual representation of an execution state of the program during execution, and wherein the interface includes an option to access event-based information corresponding to each of the data streams.

2. The computer-implemented method of claim 1, wherein the visual graph is animated in response to events occurring in the data streams.

3. The computer-implemented method of claim 2, wherein the visual graph indicates when an event occurs in a given data stream of the data streams by applying a visual animation to a dot corresponding to the given data stream.

4. The computer-implemented method of claim 1, wherein the interface includes an option to access the event-based information corresponding to each of the data streams represented by each of the particular dots in the visual graph.

5. The computer-implemented method of claim 1, wherein the interface includes an option to replay execution of the program.

6. The computer-implemented method of claim 5, wherein the instructions further cause the system to perform:
determining that the option was selected; and
applying one or more animations to the visual graph based on a replayed execution of the program.

7. The computer-implemented method of claim 1, wherein the instructions further cause the system to perform:
providing a timeline in the interface, wherein the timeline indicates when events occur during execution of the program.

8. A system comprising:
one or more processors; and
memory storing instructions that, when executed by the one or more processors, cause the system to perform:
executing a program that produces data streams;
generating a visual graph based at least in part on the data streams, wherein the data streams are represented in the visual graph as respective particular dots, a connection between a pair of the data streams is represented in the visual graph as an arc connecting a pair of the particular dots, a combination or a sum of events originating from at least a first particular dot and a second particular dot of the particular dots is represented in the visual graph as an other dot, the first particular dot indicates a first event being detected at a first frequency, the second particular dot indicates a second event being detected at a second frequency, and the other dot indicates the first event being detected and the second event being detected, the other dot being animated at the first frequency in response to the first event being detected at a data stream represented by the first particular dot and animated at the second frequency in response to the second event being detected at a data stream represented by the second particular dot; and
providing the visual graph for presentation through an interface, wherein the visual graph provides a visual representation of an execution state of the program during execution, and wherein the interface includes an option to access event-based information corresponding to each of the data streams.

9. The system of claim 8, wherein the visual graph is animated in response to events occurring in the data streams.

10. The system of claim 9, wherein the visual graph indicates when an event occurs in a given data stream of the data streams by applying a visual animation to a dot corresponding to the given data stream.

11. The system of claim 8, wherein the interface includes an option to access the event-based information corresponding to each of the data streams represented by each of the particular dots in the visual graph.

12. The system of claim 8, wherein the interface includes an option to replay execution of the program.

13. The system of claim 12, wherein the instructions further cause the system to perform:
determining that the option was selected; and
applying one or more animations to the visual graph based on a replayed execution of the program.

14. The system of claim 8, wherein the instructions further cause the system to perform:
providing a timeline in the interface, wherein the timeline indicates when events occur during execution of the program.

15. The system of claim 14, wherein a segment in the timeline can be selected to identify events that occurred during a time interval corresponding to the segment.

16. The system of claim 8, wherein the instructions further cause the system to perform:

identifying data streams having no remaining detectable events as being completed;

indicating data streams that have been identified as being completed as ready for garbage collection; and removing dots and arcs corresponding to data streams indicated as ready for garbage collection.

17. The system of claim 8, wherein the instructions further cause the system to perform:

in response to a total number of the particular dots exceeding a threshold number, removing one of the particular dots; and in response to a total number of connections exceeding a second threshold number, removing one of the connections.

18. A non-transitory computer readable medium comprising instructions that, when executed, cause one or more processors to perform:

executing a program that produces data streams;

generating a visual graph based at least in part on the data streams, wherein the data streams are represented in the visual graph as respective particular dots, a connection between a pair of the data streams is represented in the visual graph as an arc connecting a pair of the particular dots, a combination or a sum of events originating from at least a first particular dot and a second particular dot of the particular dots is represented in the visual graph as an other dot, the first particular dot indicates a first event being detected at a first frequency, the second particular dot indicates a second event being detected at a second frequency, and the other dot indicates the first event being detected and the second event being detected, the other dot being animated at the first frequency in response to the first event being detected at a data stream represented by the first particular dot and animated at the second frequency in response to the second event being detected at a data stream represented by the second particular dot; and providing the visual graph for presentation through an interface, wherein the visual graph provides a visual representation of an execution state of the program during execution, and wherein the interface includes an option to access event-based information corresponding to each of the data streams.

\* \* \* \* \*